United States Patent [19]

Kipnis

[11] Patent Number: 5,101,482
[45] Date of Patent: Mar. 31, 1992

[54] BUS-BASED PRIORITY ARBITRATION SYSTEM WITH OPTIMUM CODEWORDS

[75] Inventor: Shlomo Kipnis, Brookline, Mass.

[73] Assignee: Massachusetts Institute of Technology, Cambridge, Mass.

[21] Appl. No.: 422,158

[22] Filed: Oct. 16, 1989

[51] Int. Cl.[5] ............................................. G06F 13/00
[52] U.S. Cl. ...................................................... 395/325
[58] Field of Search ................................. 364/200, 900

[56] References Cited

U.S. PATENT DOCUMENTS

| | | | |
|---|---|---|---|
| 3,593,300 | 7/1971 | Driscoll, Jr. | 364/200 |
| 4,156,277 | 5/1979 | Seitz et al. | |
| 4,621,342 | 11/1986 | Capizzi et al. | 364/900 |
| 4,633,392 | 12/1986 | Vincent et al. | 364/200 |
| 4,633,394 | 12/1986 | Georgiou et al. | 364/200 |
| 4,851,996 | 7/1989 | Boioli et al. | 364/200 |

FOREIGN PATENT DOCUMENTS 1365838  9/1974  United Kingdom.

OTHER PUBLICATIONS

"Contention-Resolving Circuits for Computer Interrupt Systems", by D. M. Taub, Proceedings of the Institution of *Electrical Engineers*, vol. 23, No. 9, Sep. 1976, pp. 845–850.

"Contention Delay in Distributed Priority Networks", by D. Del Corso and L. Verrua, *Microprocessing and Microprogramming*, vol. 13, No. 1, Jan. 1984, pp. 21–29.

"Arbitration and Control Acquisition in the Proposed IEEE 896 Futurebus", by D. M. Taub, *IEEE Micro*, vol. 4, No. 4, Aug. 1984, pp. 28–41.

"Microprocessor Bus Structures and Standards", by Paul L. Borrill, *IEEE Micro*, vol. 1, No. 1, Feb. 1981, pp. 84–95.

*Primary Examiner*—Michael R. Fleming
*Assistant Examiner*—Ayaz R. Sheikh
*Attorney, Agent, or Firm*—Hamilton, Brook, Smith & Reynolds

[57] ABSTRACT

A bus-based priority arbitration system employs optimum priority codewords to arbitrate in time t. For m arbitration busses, each priority codeword has m bits and at most t intervals of consecutive 0's or consecutive 1's, disregarding leading consecutive 0's. The arbitration busses are wired-OR busses. An arbitration protocol performed by the modules involved in an arbitration process applies respective codewords of the contending modules to the arbitration busses, each bit on a different bus. The codewords insure that the modules determine from the arbitration busses the contending module of highest priority in at most t units of time. Also, the arbitration system defines priority codewords as a function of arbitration time and number of aribitration busses which enables design optimization of a desired arbitration system. In one case, the number of arbitration busses m required in a system of n supportable modules is defined by the relationships $\lceil \lg n \rceil \leq m \leq \lceil \lg n \rceil + 1$ and $t = \lceil \frac{1}{2} \lg n \rceil$.

19 Claims, 5 Drawing Sheets

BUS-BASED PRIORITY ARBITRATION SYSTEM WITH OPTIMUM CODEWORDS

The Government has rights in this invention pursuant to contract Number N0001487-K-0825 awarded by the Department of the Navy.

BACKGROUND OF THE INVENTION

In many electronic systems there are situations where several modules wish to use a common resource simultaneously. Examples include microprocessor systems where a decision is required concerning which of several interrupts to service first, multiprocessor environments where several processors wish to use some device concurrently, and data communication networks with shared media. To resolve conflicts, an arbitration mechanism is required that grants the resource to one module at a time.

Numerous arbitration mechanisms have been developed, including daisy chains, priority circuits, polling, token passing, and carrier sense protocols, to name a few. A distinction is made between centralized arbiters, where a specific module is responsible for arbitrating, and distributed arbiters, where the arbitration process is carried out simultaneously at all the system modules. In many modern systems, and especially in multiprocessor environments and data communication networks, distributed arbitration is the preferred mechanism due to its reliability, easy expansion and simple monitoring.

Typically, a distributed arbitration mechanism employs a collection of arbitration busses to implement priority arbitration. To this end, each module is assigned a unique arbitration priority, which is an encoding of its name or address. During arbitration between contending modules, each contending module asserts its arbitration priority onto the arbitration busses according to an arbitration protocol. The arbitration protocol determines logic values that a contending module applies to the arbitration busses, based on the contending module's arbitration priority and on logic values on the busses. After completion of an arbitration process, the settled logic values on the arbitration busses uniquely identify the contending module with the highest priority.

An example of a distributed priority arbitration mechanism is the asynchronous binary arbitration scheme (also called "encoded arbitration") developed by D. M. Taub in "Contention-Resolving Circuits for Computer Interrupt Systems", *Proceedings of the IEE*, Volume 123, No. 9, September 1976, Pages 845-850. The asynchronous binary arbitration scheme has gained popularity and is used in many modern bus systems such as Futurebus, M3-bus, S-100 bus, Multibus-II, Fastbus, and Nubus. This asynchronous arbitration scheme arbitrates among n modules in at most $t = \lceil \lg n \rceil$ units of time, using $m = \lceil \lg n \rceil$ open-collector (wired-OR) arbitration busses. (Hereinafter only arbitration busses that are used for encoding the arbitration priorities are counted. Several additional control busses are understood to be used by all schemes and are not counted.)

Each module is assigned a unique ($\lceil \lg n \rceil$)-bit arbitration priority. When arbitration begins, competing modules apply their arbitration priorities to the $m = \lceil \lg n \rceil$ busses, each bit on a separate bus. The busses are initially at logic level 0. The open-collector busses implement a bitwise OR of the asserted arbitration priorities. That is, the open-collector busses provide a default logic value of 0 on a bus, unless at least one module applies a logic value of 1 to the bus, in which case the logic value on the bus becomes a 1. The open-collector busses, thus, OR together the logic values applied to them, with some time delay referred to as "bus-settling delay".

During arbitration, each competing module monitors the arbitration busses and disables its drivers according to the following rule: if the module is applying a 0 (that is, not applying a 1) to a particular bus but detects that the bus is carrying a 1 (applied by some other competing module), it ceases to apply all its bits of lower significance than that of the bit (0) applied to the particular bus. Disabled bits are re-enabled when the condition ceases to hold. This rule is continuously applied to all the bus drivers. The effect of this rule is that the arbitration process proceeds in at most $\lceil \lg n \rceil$ stages, each taking one unit of bus-settling delay, from the most significant bit to the least significant bit of the arbitration priorities.

In the worst case, each unit of time delay (stage) consists of resolving the binary value of another bit of the competing module with the highest priority, from the most significant bit down to the least significant bit. This leads to a worst case arbitration time of $t = \lceil \lg n \rceil$ (in units of bus-settling delay).

Another commonly used priority arbitration mechanism is the linear arbitration scheme. This scheme uses $m = n$ busses and arbitrates among n modules in $t = 1$ stage. Each module is assigned an n-bit arbitration priority which includes only one bit having binary value 1. The 1-bit of different modules is asserted onto different busses. Thus, during arbitration, contending module $c_i$ applies a 1 to arbitration bus $b_i$ for $0 \leq i \leq n-1$ and does not interfere with other busses. Initially, the busses are all at logic level 0. After $t = 1$ unit of time (bus-settling delay), all the arbitration busses stabilize to their final values and the module with a 1 on the arbitration bus with the highest priority is recognized as the winner. This scheme can also be implemented with tri-state busses, since at most one module writes to any given bus. The scheme is also known as "decoded arbitration" and is used in a number of bus systems and interrupt arbitration mechanisms.

The focus of the present invention is on asynchronous priority arbitration systems that employ m arbitration busses for $\lceil \lg n \rceil \leq m \leq n$. In these systems, the arbitration circuitry on the modules together with the arbitration busses form a purely combinational acyclic circuit. That is, there are no storage elements or feedback paths in the arbitration logic. Further, the only means of communication between modules is through the system-wide busses.

An arbitration process, once started, runs asynchronously until its completion. That is, the arbitration process does not use any clock signals during its progress. An important parameter in such systems is the maximal delay required to complete any arbitration process in the system. This parameter is referred to as "arbitration time". A common practice is to measure the arbitration time in units of bus-settling delay, which is the time it takes a bus to reach a stable logic value once its drivers have stabilized. This unit of time is meant to include the delays introduced by the logic gates, drivers, bus-propagation delay, and any additional time required to resolve transient effects on the bus. An open-collector (wired-OR) bus is modelled as an OR gate with delay of bus-settling time. Arbitration processes are analyzed as a sequence of stages, each of duration of one bus-settling delay.

Reducing the arbitration time is of primary importance in system design. Whether the system employs global or local clocks and allocates a certain amount of time for arbitration, or the system employs self-timed logic, minimizing the duration of arbitration processes is a fundamental concern. For example, D. Del Corso and L. Verrua in "Contention Delay in Distributed Priority Networks", *Microprocessing and Microprogramming*, volume 13, no. 1, January 1984, pages 21–29, develop a technique to reduce the arbitration time of the asynchronous binary arbitration scheme of Taub by one unit of bus-settling delay. Their technique involves using $m = \lceil \lg(n+1) \rceil$ arbitration busses, and eliminating one m-bit codeword to reduce the arbitration time of binary arbitration to $t = \lceil \lg(n+1) \rceil - 1$.

The foregoing commonly used asynchronous priority arbitration schemes present the extremes in the trade-off between the number of arbitration busses required and the arbitration time. The bus-time trade-off is of great practical interest to system designers who desire a certain balance between the amount of hardware and speed. Accordingly, there is a need for an asynchronous priority arbitration system with a balance between the number of arbitration busses employed and the arbitration time.

SUMMARY OF THE INVENTION

The present invention provides a distributed asynchronous priority arbitration system with a bus-time tradeoff between the extremes of the prior art systems. This is accomplished by the present invention employing arbitration priorities that exhibit controlled data-dependent delays during arbitration processes. For instance, the arbitration time of a system of the present invention can be any number units of time shorter than that of prior art binary arbitration systems, or it can divide prior art arbitration time by a constant greater than one.

In the present invention, different binary arbitration priorities are assigned to different modules of a system for indicating different priorities of the modules. The arbitration priorities of modules involved in an arbitration process are applied to the wired-OR arbitration circuit of prior art binary arbitration. The controlled data-dependent delays of each applied arbitration priority enable reduced arbitration time compared to that of prior art.

The arbitration priorities of the present invention are determined according to parameters m (number of busses) and/or t (maximum number of stages to complete arbitration) for values of $\lceil \lg n \rceil \leq m \leq n$ and $1 \leq t \leq \lceil \lg n \rceil$ where n is the number of modules in the system. The most modules n among which this system can arbitrate using m busses and t units of time is $$n = \sum_{i=0}^{t} \binom{m}{i}.$$

Specifically, the arbitration priorities of the present invention are selected from all possible m-bit binary codewords (strings of 0's and 1's) that have at most t intervals of consecutive 1's or 0's without counting leading 0's, for t and m as above.

A preferred embodiment of the present invention improves on the asynchronous binary arbitration system by reducing the arbitration time from $\lceil \lg n \rceil$ to $\frac{1}{2} \lceil \lg n \rceil$ units of time. The preferred embodiment uses at most one more arbitration bus in addition to the $\lceil \lg n \rceil$ busses of binary arbitration. Said another way, in a preferred embodiment of the present invention, arbitration among n modules is performed on $\lceil \lg n \rceil \leq m \leq \lceil \lg n \rceil + 1$ arbitration busses in $t = \lceil \frac{1}{2} \lg n \rceil$ units of bus-settling delay. The same arbitration protocol of asynchronous binary arbitration is employed but with select m-bit arbitration priorities. The select arbitration priorities are those m-bit binary codewords that have at most $t = \lceil \frac{1}{2} \lg n \rceil$ intervals of consecutive 1's or 0's disregarding leading 0's.

BRIEF DESCRIPTION OF THE DRAWINGS

The foregoing and other objects, features and advantages of the invention will be apparent from the following more particular description of preferred embodiments of the invention, as illustrated in the accompanying drawings.

FIG. 2 is a schematic illustration of a typical prior art asynchronous binary arbitration process with four arbitration busses.

FIG. 3 is a schematic illustration of a typical asynchronous arbitration of the present invention with five arbitration busses.

DETAILED DESCRIPTION OF THE PREFERRED EMBODIMENTS

Figure 1:
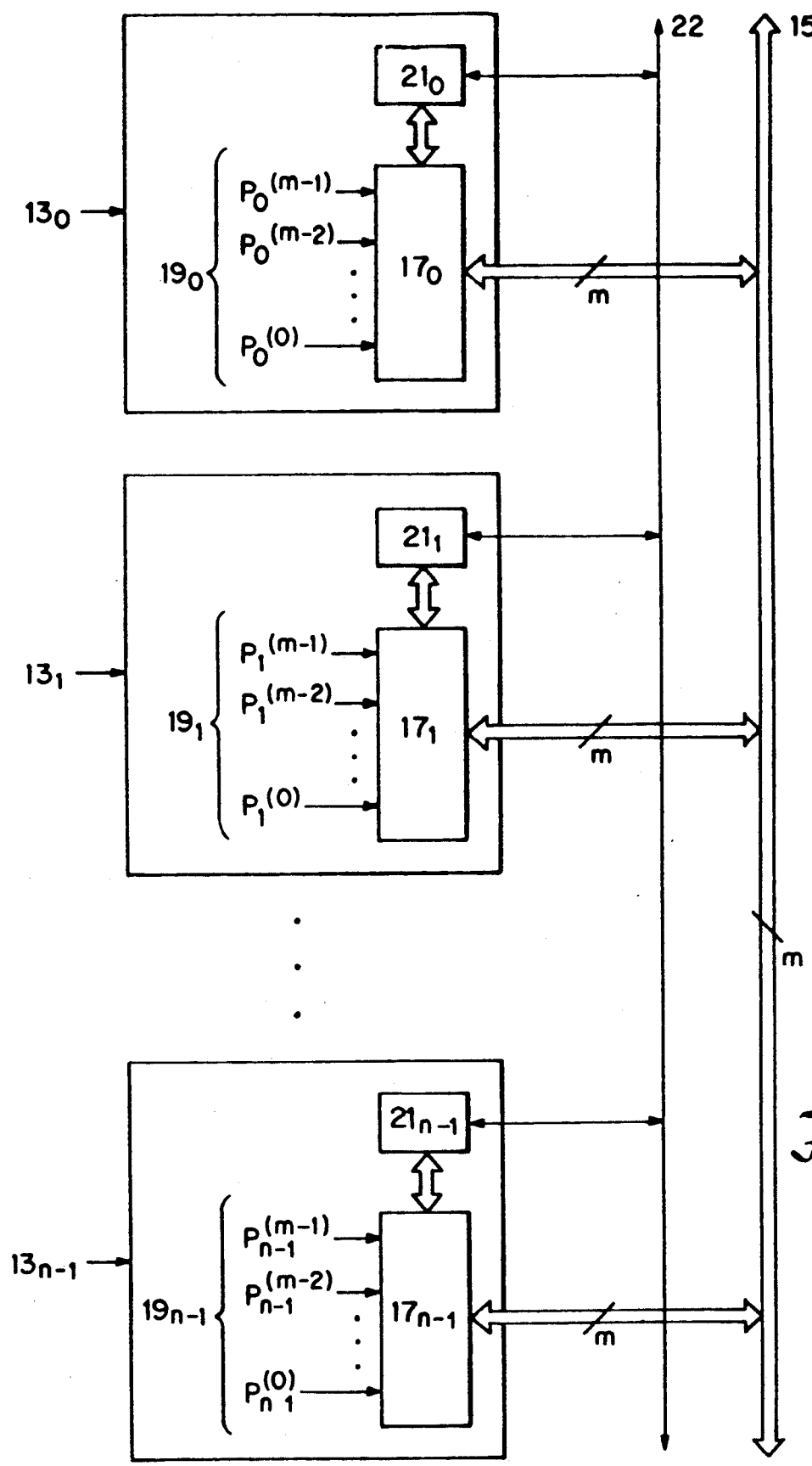
FIG. 1 is a block diagram of an electronic system which embodies the present invention.

An electronic system embodying the present invention generally includes several (n) modules 13 linked to a set of arbitration busses 15 and various other control busses, such as bus 22 illustrated in FIG. 1. The modules 13 are, for example, processors in a multiprocessor environment, or peripheral and/or I/O devices in a uniprocessor environment. In the latter case, control bus 22 and arbitration busses 15 are connected to a central processor.

Typically, each module 13 has its own processing capabilities and memory. When a module 13 wished to use a certain common resource, the module 13 transmits an indicative signal across a pertinent control bus 22. Since other modules 13 may wish to use the same resource simultaneously, and hence may also be trying to transmit across control bus 22, an arbitration protocol 21 is needed. The same arbitration protocol 21 resides in each module 13 and aids in determining which module 13 is to be granted use of the resource depending on relative urgency or precedence.

The arbitration protocol 21 begins by one or more contending modules 13 broadcasting a signal, usually called "request" or "arbitrate", over control bus 22 to all the modules 13. In response, the contending modules 13 (i.e. the modules which simultaneously made the requests for the same resource) apply their respective arbitration priorities 19 to the set of arbitration busses 15. The arbitration priorities 19 are encodings of the identification names (addresses) of the contending modules 13 and are used by the arbitration protocol 21 to determine logic values to apply to the arbitration busses 15 as discussed later.

Upon completion of an arbitration process, the arbitration busses 15 hold logic values which correspond to the arbitration priority 19 of the contending module 13 with highest priority/precedence. That module 13 proceeds by gaining access to and using the resource as desired.

Preferably there are m arbitration busses 15 and each is an open collector (wired-OR) bus as disclosed in "Contention Resolving Circuits for Computer Interrupt Systems" by D. M. Taub, *Proceedings of IEE*, Volume 123, No. 9, September 1976, Pages 845-850, herein incorporated by reference and summarized later. Each of the n modules 13 of the system of FIG. 1 is connected to all m arbitration busses 15 and can read from and write to any arbitration bus. As mentioned above, all modules 13 follow the same arbitration protocol 21 in interfacing with the arbitration busses 15 and reaching conclusions concerning the arbitration process. It is understood that during the arbitration protocol 21 only contending or competing modules 13 apply logic values to the arbitration busses 15; non-competing modules 13 do not interfere with the arbitration busses 15.

For arbitration, each of the n modules 13 of the system is assigned an m-bit arbitration priority 19, where m is the number of arbitration busses 15 employed by the system. Each arbitration priority 19 encodes the respective module's 13 name and is chosen from an optimal set of m-bit codewords described later. In response to the generated "request" or "arbitrate" signal, the contending modules 13 apply their arbitration priorities 19 to the m arbitration busses 15, each bit of the arbitration priority 19 on a separate arbitration bus 15.

Initially, the arbitration busses 15 are at logic level 0. The arbitration busses 15 bitwise OR together the applied arbitration priorities 19 over a first unit of bus-settling delay. Each contending module 13 continuously monitors the arbitration busses 15 and disables its drivers 17 according to the rule used in the binary arbitration scheme of Taub. The rule states: if the competing module 13 is applying a 0 (that is, not applying a 1) to a particular arbitration bus 15 but detects that the bus is carrying a 1 (applied by some other competing module 13), the competing module 13 ceases to apply all its bits of significance lower than that of the 0 bit applied to the particular bus 15. Disabled bits are re-enabled when the condition ceases to hold.

After contending modules 13 have disabled their drivers 17 according to the rule, the arbitration busses 15 bitwise OR remaining applied logic values of the arbitration priorities 19 over a second unit of bus-settling delay. At this time, each contending module 13 monitors the arbitration busses 15 and re-enables/disables its drivers 17 according to the rule. The arbitration busses 15 bitwise OR the resulting applied logic values of the arbitration priorities 19 over a third unit of bus-settling delay and so forth. At the end of at most t units of bus-settling delay, the resulting logic values on the arbitration busses 15 (after a last bitwise OR) identify the contending module 13 with the highest priority. That is, the resulting logic values are the logic values of the bits of the arbitration priority of the contending module 13 with the highest priority.

The contending modules 13 read the resulting logic values (i.e. the highest priority arbitration priority/codeword) from the arbitration busses 15 at the end of the arbitration, and determine therefrom how to proceed. Specifically, the contending module 13 which was assigned to that arbitration priority/codeword proceeds to use the resource while the other contending modules 13 wait.

Although the asynchronous binary arbitration scheme of the prior art employs the same wired-OR busses and the same arbitration protocol (rule) as the present invention, the binary arbitration scheme of prior art uses arbitration priorities/codewords of length $m = \lceil \lg n \rceil$ bits to arbitrate among n modules in at most $t = \lceil \lg n \rceil$ units of time. The present invention uses select (optimal) m-bit arbitration priorities/codewords 19 which ensure arbitration among n modules in at most arbitration time t, where $\lceil \lg n \rceil \leq m \leq n$ and $1 \leq t \leq \lceil \lg n \rceil$ respectively. Further m and t are user/designer specifiable integers.

Hence, the arbitration system of the present invention provides the needed/wanted trade-off between number of arbitration busses and arbitration time as further discussed later. This bus-time tradeoff has the form $$n = \sum_{l=0}^{t} \binom{m}{l},$$

which by Stirling's formula exhibits asymptotic behavior $$m = \frac{1}{e} t n^{1/t}.$$

Figure 6:
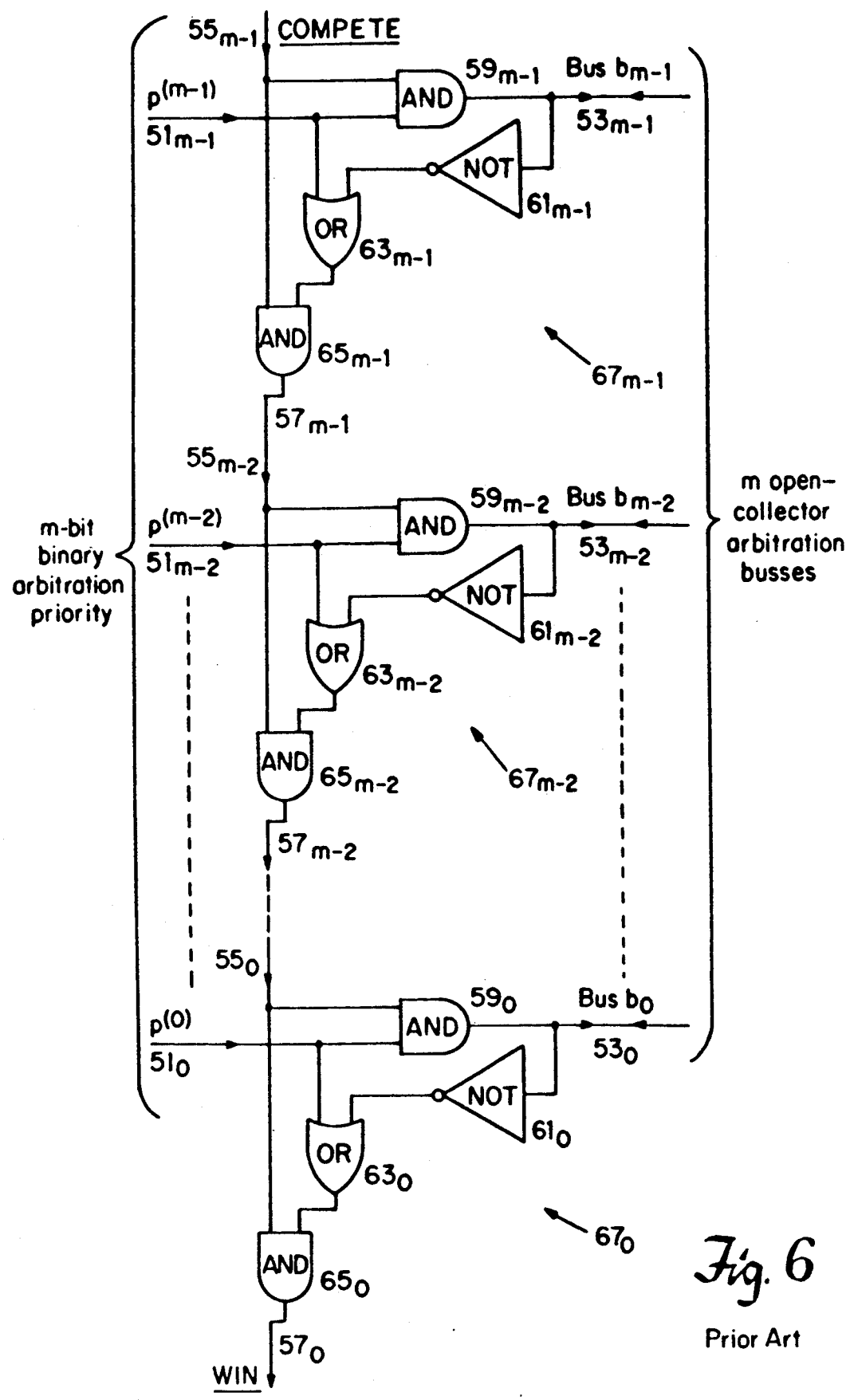
FIG. 6 is a typical schematic logic implementation of the arbitration protocol of asynchronous binary arbitration by Taub.

FIG. 6 presents a typical hardware implementation for the arbitraiton protocol of the asynchronous binary arbitration scheme of Taub, which is employed in the implementation of the present invention in FIG. 1. Such hardware exists on each module supported by the arbitration system. FIG. 6 demonstrates the arbitration circuitry of a module with an m-bit arbitration priority $p^{(m-1)} p^{(m-2)} \ldots p^{(0)}$ 51, which drives and monitors m open-collector arbitration busses $b_{m-1}, b_{m-2}, \ldots, b_0$ 53.

The arbitration circuitry of FIG. 6 consists of m 1-bit driving and monitoring circuits 67. Each 1-bit driving and monitoring circiut 67 has three inputs: one bit of arbitration priority 51, logic value on arbitration bus 53, and "Enable"/"Disable" signal 55, and produces two outputs: logic value for arbitration bus 53, and "Enable"/"Disable" signal 57 for the next stage (i.e. the succeeding driving and monitoring circuit 67).

The logic value asserted onto arbitration bus 53 is computed by taking logic AND 59 of the arbitration priority bit 51 and the "Enable"/"Disable" signal 55. Said another way, the logic value driven onto the arbitration bus 53 is the corresponding priority arbitration bit 51 if the "Enable"/"Disable" signal 55 is logic 1 (enable state), and the logic value 0 if the "Enable"/"Disable" signal 55 is logic 0 (disable state).

The "Enable"/"Disable" signal 57 for the next stage (the succeeding circuit 67) is computed from the corresponding priority arbitration bit 51, the logic value on arbitration bus 53, and the current "Enable"/"Disable" signal 55, through logic gates NOT 61, OR 63, AND 65, as illustrated in FIG. 6. The "Enable"/"Disable" signal 57 for the next stage is set to logic value 0 (disable state) in either of the two cases: (a) the current "Enable"/"Disable" signal 55 is in logic value 0 (disable state), or (b) the priority arbitration bit 51 is 0 and the logic value on the arbitration bus 53 is 1. The "Enable"/"Disable" signal 57 for the next stage is enabled (set to logic value 1) as soon as both conditions (a) and (b) above cease to hold.

The initial "Enable"/"Disable" signal $55_{m-1}$ is also called "COMPETE"; it is set to 1 if the module contends in the arbitration process, and is set to 0 otherwise. The last "Enable"/"Disable" signal $57_0$ is also called "WIN"; it indicates whether the module is the winner of the arbitration process if WIN=1, or not if WIN=0.

Figures 2, 3:
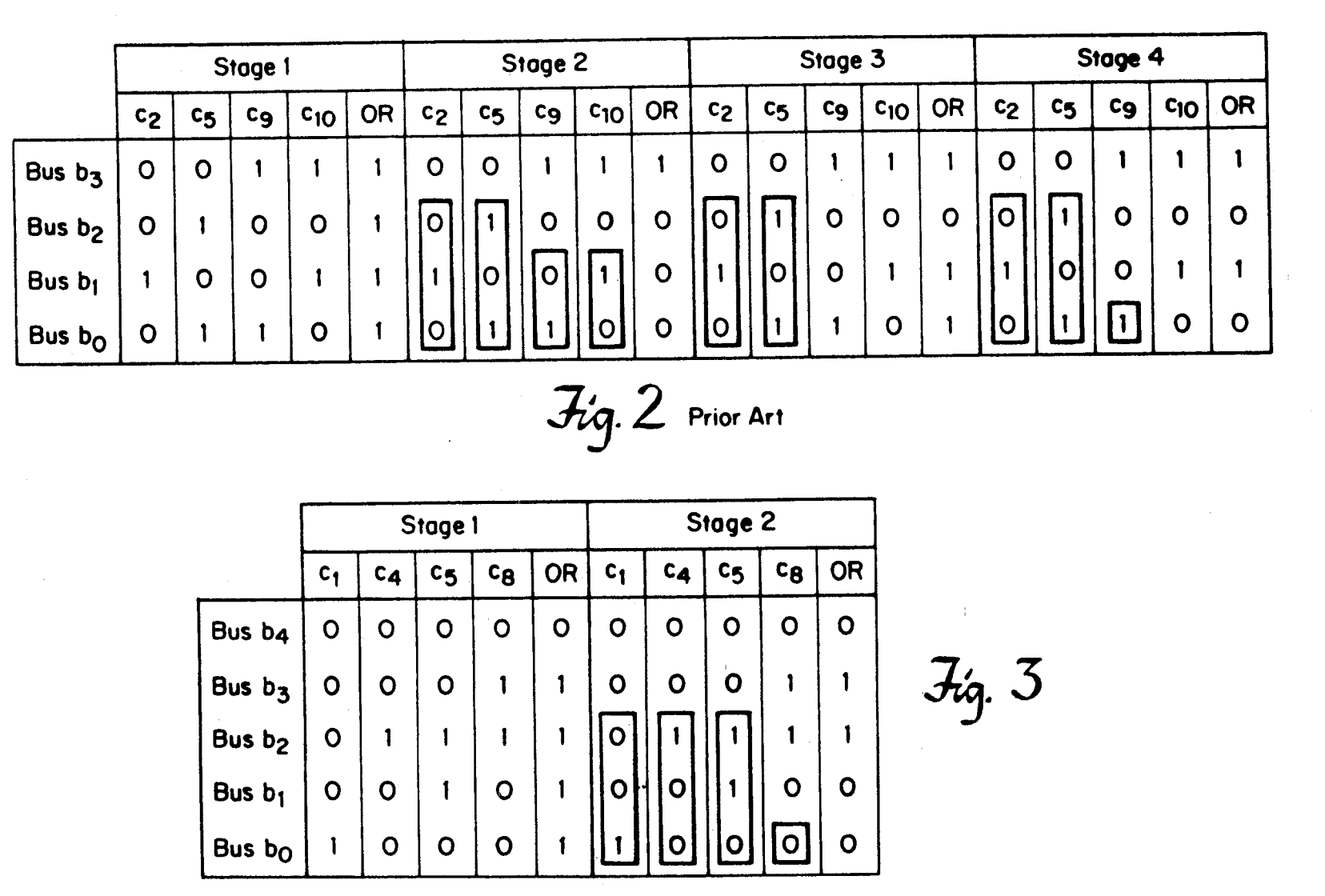

To further illustrate the foregoing contrast between the asynchronous binary arbitration system of the prior art and the present invention, examples of corresponding arbitration processes are provided in FIGS. 2 and 3. Throughout the examples and the succeeding discussion the following notation is used. The set $C=\{c_0, c_1, \ldots, c_{n-1}\}$ denotes the n system modules 13 of FIG. 1, which are indexed in increasing order of priority. The set of m open-collector (wired OR) arbitration busses 15 of FIG. 1 is denoted by $B=\{b_0, b_1 \ldots, b_{m-1}\}$, where the arbitration busses are indexed in increasing order of significance. The set $P=\{p_0, p_1 \ldots, p_{n-1}\}$ consists of n distinct arbitration priorities 19 of FIG. 1, with $p_i$ being the arbitration priority of module $c_i$. The bits of an arbitration priority p are denoted by $p^{(0)}, p^{(1)}, p^{(2)}, \ldots$, in order of increasing significance.

In the example of the prior art asynchronous binary arbitration process of FIG. 2, consider a system of n=16 modules that uses m= lg 16 =4 arbitration busses. There are sixteen possible arbitration priorities consisting of all the 4-bit binary addresses {0000, 0001, 0010, 0011, 0100, 0101, 0110, 0111, 1000, 1001, 1010, 1011, 1100, 1101, 1110, 1111}. Four such modules $c_2, c_5, c_9$ and $c_{10}$, with corresponding arbitration priorities 0010, 0101, 1001, and 1010 are illustrated as the competing modules in a sample arbitration process in FIG. 2.

The arbitration process begins by modules $c_2, c_5, c_9$ and $c_{10}$ applying their respective arbitration priorities to the arbitration busses $b_0, b_1, b_2$ and $b_3$ with bus $b_3$ receiving the the most significant bits of the arbitration priorities. The arbitration busses bitwise OR the four arbitration priorities after one unit of bus settling delay (stage 1). Here, bus $b_3$ settles to the value 1, where it will remain for the duration of the arbitration process.

By the arbitration rule provided previously, each of the competing modules monitors the arbitration busses whose current logic values are represented in the OR column of stage 1 in FIG. 2. Thus, each of modules $c_2$ and $c_5$ disables its last three bits because of the 1 on arbitration bus $b_3$. And each of modules $c_9$ and $c_{10}$ disables its last two bits because of the 1 on arbitration bus $b_2$.

The arbitration busses then proceed by bitwise ORing the remaining applied logic values shown in the unshaded areas of FIG. 2 under stage 2. Hence at the end of stage 2, bus $b_2$ settles to the value 0, where it will remain for the rest of the arbitration process.

The competing modules monitor the arbitration busses, whose logical values at this point are shown in the OR column of stage 2, and apply the arbitration rule. As a result, modules $c_9$ and $c_{10}$ re-enable in stage 3 their low order bits since arbitration busses $b_0, b_1$ and $b_2$ have logic values of 0 (OR column of stage 2).

At the end of stage 3, the arbitration busses bitwise OR currently applied logic values which results in arbitration bus $b_1$ settling to a 1. The competing modules follow the rule and monitor the arbitration busses whose logic values are at this point as shown in the OR column of stage 3 in FIG. 2. To that end, modules $c_9$ ceases to apply in stage 4 its last bit because of the 1 it detects on arbitration bus $b_1$ (OR column of stage 3).

The arbitration busses bitwise OR the currently applied logic values shown in the unshaded area of stage 4. This results in bus $b_0$ settling to a 0 at the end of stage 4. The resulting logic values on the arbitration busses form the highest arbitration priority (1010) of the competing modules and thus identify corresponding competing module $c_{10}$ to be of the highest priority of the competing modules. Therefore, the arbitration process required $t = \lceil \lg n \rceil = \lceil \lg 16 \rceil = 4$ stages (bus-settling delays) to complete.

Provided in FIG. 3 is an example of a preferred embodiment of the present invention. The preferred embodiment provides a factor of 2 improvement in arbitration time over that of asynchronous binary arbitration systems of prior art. In this example of the preferred embodiment, $m = \lceil \lg n \rceil + 1$ arbitration busses are employed, instead of the $\lceil \lg n \rceil$ busses in the prior art, to arbitrate among n modules in a reduced arbitration time of $t = \lceil \frac{1}{2} \lg n \rceil$. (Prior art arbitration time is $\lceil \lg n \rceil$.) Alternatively said, with m arbitration busses, the preferred embodiment can arbitrate among at least $2^{m-1}$ modules ( and more precisely among $$\sum_{l=0}^{\lceil \frac{1}{2}(m-1) \rceil} \binom{m}{l}$$

modules,) in $t = \lceil \frac{1}{2}(m-1) \rceil$ units of time.

Such an embodiment is further desirable because existing asynchronous binary arbitration systems with m busses and with $$n \leq \sum_{l=0}^{\lceil \frac{1}{2}(m-1) \rceil} \binom{m}{l}$$

modules are readily adaptable to implement the present invention which uses the same arbitration protocol. That is, no hardware modifications to the circuit of FIG. 6 are required, with the advantage of a shortening of the time allocated for arbitration. Only a change in arbitration priorities to the optimal arbitration priorities of the present invention (discussed later) is needed, which is typically done in software.

For purposes of illustration and not limitation of the preferred embodiment, a typical arbitration process in a system of n=16 modules which arbitrates over m= $\lceil \lg n \rceil + 1 = 5$ arbitration busses is shown in FIG. 3. 5-bit arbitration priorities/codewords of the modules are chosen from the set of optimal codewords (discussed later) consisting of (00000, 00001, 00010, 00011, 00100, 00110, 00111, 01000, 01100, 01110, 01111, 10000, 11000, 11100, 11110, 11111). The competing modules in the example of FIG. 3 are $c_1, c_4, c_5$ and $c_8$ with corresponding arbitration priorities 00001, 00100, 00110, and 01100, respectively.

The arbitration process begins by modules $c_1, c_4, c_5$ and $c_8$ applying their respective arbitration priorities to the arbitration busses $b_0, b_1, b_2, b_3$, and $b_4$ with $b_4$ receiving the most significant bits of the arbitration priorities. The arbitration busses bitwise OR the four arbitration priorities. After one unit of bus settling delay (stage 1) arbitration busses, $b_4$, $b_3$ and $b_2$ settle to respective values 0,1 and 1 where they will remain for the duration of the arbitration process.

According to the previously given rule, each of the competing modules monitors the arbitration busses whose resulting logic values at this time are represented in the OR column of stage 1. In turn, each of modules $c_1$, $c_4$ and $c_5$ disable their lower three bits because of the 1 on arbitration bus $b_3$ (OR column stage 1), and module $c_8$ disables its last bit because of the 1 on arbitration bus $b_1$ (OR column stage 1).

The arbitration busses proceed by bitwise ORing the remaining applied logic values shown in the unshaded area in stage 2 of FIG. 3. At the end of stage 2, busses $b_1$ and $b_0$ settle to the logic values 0 and 0 respectively. Thus, at this time, all the arbitration busses have settled to respective final logic values. The resulting logic values form the arbitration priority 01100 which corresponds to the competing module ($c_8$) with the highest priority of the four competing modules. This arbitration process thus required $t = \lceil \frac{1}{2} \lg n \rceil = \lceil \frac{1}{2} \lg 16 \rceil = 2$ stages (bus-settling delays).

Upon closer examination of the example of FIG. 3, disregarding leading 0 bits, each group of consecutive same bits of the highest competing arbitration priority was resolved in a respective stage (unit of bus-settling delay). Specifically, the higher order bits (011) of module $c_8$ were resolved by the end of stage 1 and the lower order bits (00) were resolved by the end of stage 2. These groups of bits were resolved in different stages because of the change from consecutive 1 bits to consecutive 0 bits, disregarding the leading zero bit, and because other modules applied 1's where module $c_8$ applied 0's.

It is this feature of resolving each group of consecutive same bits of the highest competing arbitration priority in a respective single unit of bus-settling delay on which the optimum arbitration priorities of the present invention are established. The following discusses such arbitration priorities in terms of an "interval-number" related to the concept of "consecutive same bits".

The interval-number of a binary codeword/address p is the number of intervals of consecutive 1's or consecutive 0's that the codeword contains, disregarding leading 0's. For example, the interval-number of 001011 is 3 (001/0/11), the interval-number of 0000 is 0, the interval-number of 011100100011 is 5 (0111/00/1/000/11) and the interval-number of 10101010 is 8 (1/0/1/0/1/0/1/0).

The set of optimal codewords, from which the arbitration priorities in the present invention are chosen, is the set of all m-bit binary codewords that have interval-number at most t, i.e. maximum arbitration time in units of bus-settling delay. In the preferred embodiment, arbitration priorities are chosen from the set of all m-bit binary codewords that have interval-number at most $t = \lceil \frac{1}{2}(m-1) \rceil$, where m is the number of arbitration busses in the system. This is shown from the foregoing example of the preferred embodiment in FIG. 3, where $m = \lceil \lg n \rceil + 1$ and $t = \lceil \frac{1}{2} \lg n \rceil$. From the equation defining m, one substitutes $m-1$ for $\lceil \lg n \rceil$ in the equation defining t. Thus, $t = \lceil \frac{1}{2} \lg n \rceil = \lceil \frac{1}{2} \lg n \rceil = \lceil \frac{1}{2}(m-1) \rceil$ in the preferred embodiment.

Thus, for a given $m = 4$ and a given desired $t = 3$, the set of 4-bit binary codewords that have interval-number at most t is the set of 4-bit binary codewords which have at most $t = 3$ intervals of consecutive 0's or 1's, disregarding leading 0's. The set contains fifteen optimal codewords as follows {0000, 0001, 0010, 0011, 0100, 0101, 0110, 0111, 1000, 1001, 1011, 1100, 1101, 1110, 1111}. Arbitration priorities from this set of optimal codewords are the select arbitration priorities/addresses assigned to $$n \leq \sum_{i=0}^{3} \binom{4}{i}$$

(i.e. $n \leq 15$) modules in a system of the present invention. And in the example of the preferred embodiment for a given $m = 4$, the set of 4-bit binary codewords/addresses that have at most $t = \lceil \frac{1}{2}(m-1) \rceil = \lceil \frac{1}{2}(4-1) \rceil = 2$ intervals of consecutive 1's or 0's disregarding leading 0's is {0000, 0001, 0010, 0011, 0100, 0110, 0111, 1000, 1100, 1110, 1111}. This set contains eleven optimal codewords from which to assign select arbitration priorities to at most $$\sum_{i=0}^{2} \binom{4}{i} = 11$$

modules of a system of the preferred embodiment with $m = 4$ arbitration busses.

It can be shown that for a given number of arbitration busses m, there are exactly $$\sum_{i=0}^{t} \binom{m}{i}$$

such select arbitration priorities in the set of optimal codewords of interval-number at most t for $t \leq m$. That is, given the set G(m,t), the set of all m-bit binary codewords that have interval-number at most t, there are $$\sum_{i=0}^{t} \binom{m}{i}$$

distinct codewords in the set. This is proven true by taking all the codewords in G(m,t) and appending a 0 at their beginning. A set of (m+1)-bit codewords results, where each codeword begins with a 0 and has at most t switching points from a consecutive interval of 0's to a consecutive interval of 1's and vice versa. Since there are $$\sum_{i=0}^{t} \binom{m}{i}$$

possibilities of choosing at most t switching points out of m possible positions, there are that many such codewords.

Specifically, define the set D(m) of optimal codewords of length m and interval-number at most $\lceil \frac{1}{2}(m-1) \rceil$ for the preferred embodiment as $D(m) = G(m, \lceil \frac{1}{2}(m-1) \rceil)$. According to the foregoing $$/D(m)/ = \sum_{l=0}^{\lceil\frac{1}{2}(m-1)\rceil} \binom{m}{l}.$$

This sum includes the first $\lceil\frac{1}{2}(m-1)\rceil+1$ binomial coefficients, which constitutes at least a half of all the possible $m+1$ binomial coefficients. The partial sum is therefore at least a half of the full sum which is $2^m$. Therefore $/D(m)/ \geq \frac{1}{2}(2^m) = 2^{m-1}$.

Accordingly, there are enough (at least $2^{m-1}$) optimal codewords/arbitration priorities of length m bits and interval-number at most $\lceil\frac{1}{2}(m-1)\rceil$ for a desired system of the preferred embodiment of the present invention.

Further, the present invention provides that with m arbitration busses, the optimal arbitration priorities as determined from the foregoing (i.e. with interval-number at most t) ensure arbitration in at most t units of time (stages), for $t \leq m$. This is due to the interval-number of the highest arbitration priority, competing in an arbitration, bounding the number of arbitration stages. The following uses data-dependent analysis to argue that any arbitration process takes at most r stages, where r is the interval-number of the highest competing arbitration priority, by showing that at each stage the arbitration process resolves at least one more interval of consecutive 1's or 0's of the highest competing arbitration priority.

Let Q be a set of competing arbitration priorities, p be the highest arbitration priority in Q, and r be the interval-number of p. Then after s stages, for any $s \geq r$, bus $b_j$ carries the logic value $p^{(j)}$, for $0 \leq j \leq m-1$. This is proven by induction on r for arbitrary values of m. Use the notation $v_j[k]$ to denote the logic value on bus $b_j$ at the end of stage k, for $j = 0, 1, \ldots, m-1$ and $k = 0, 1, \ldots$ Base case: $r = 0$. The codeword p consists of m consecutive 0's, that is, $p^{(j)} = 0$ for $j = 0, 1, \ldots, m-1$. Since p is the highest arbitration priority in Q, then any $q \in Q$ must also have $q^{(j)} = 0$ for $j = 0, 1, \ldots, m-1$. By the assumption that all the m busses are initially in logic value 0, and since according to the acyclic nature of the arbitration protocol no module ever applies a 1 to any of these busses, the m busses remain in logic value 0 forever. In other words, after s stages, for any $s \geq r = 0$, $v_j[s] = v_j[0] = 0 = p^{(j)}$, for $j = 0, 1, \ldots, m-1$.

Inductive case: $r > 0$. The codeword p has m bits and interval-number r, and is thus of the form $p = 0^{m_0} 1^{m_1} 0^{m_2} 1^{m_3} \ldots \delta^{m_r}$, where $\delta \in \{0,1\}$; $m_0 \geq 0$; $m_j > 0$ for $1 \leq j \leq r$; and $$\sum_{j=0}^{r} m_j = m.$$

Concentrate on the first $r-1$ intervals of p, and define the set R of reduced codewords of length $$m - m_r = \sum_{j=0}^{r-1} m_j.$$

by ignoring the last $m_r$ bits of the codewords of Q. It is easy to verify that p', the reduced version of p, is the highest codeword in R, because the $m_r$ least significant bits of codewords in Q have been discarded. Furthermore, the interval-number of p' is $r-1$, since the last interval of p of the form $\delta^{m_r}$ was ignored. By applying the claim inductively with m' busses, the set of competing arbitration priorities R, and the highest arbitration priority p' of interval-number $r-1$, one finds that after $r-1$ stages the most significant $m' = m - m_r$ busses stabilize to the bits of p'. That is, for any $k \geq r-1$, $v_j[k] = v_j[r-1] = p'^{(j)} = p^{(j)}$, for $m_r \leq j \leq m-1$.

Now consider the last $m_r$ busses: $b_{m_r-1}, \ldots, b_1, b_0$. There are two cases to consider:

$\delta = 1$: The rth interval of p is an interval of $m_r$ consecutive 1's, that is, $p^{(i)} = 1$ for $i = 0, 1, \ldots, m_r - 1$. After k stages, for any $k \geq r-1$, the most significant $m - m_r$ busses carry the bits of p, and therefore there is no 1 in the range $0 \leq l \leq m-1$ with $v_l[k] = 1$ and $p^{(l)} = 0$. As a result, after k stages, the module with arbitration priority p applies all its last $m_r$ consecutive 1's. Therefore, for any $s \geq r$ and $i = 0, 1, \ldots m_r - 1$, $v_i[s] = v_i[r] = 1 = p^{(i)}$, since the busses implement a wired-OR in one stage.

$\delta = 0$: The rth interval of p is an interval of $m_r$ consecutive 0's, that is, $p^{(i)} = 0$ for $i = 0, 1, \ldots, m_r - 1$. Since p is the highest arbitration priority in Q, then for any arbitration priority $q \in Q$, $q \neq p$, there must exist an l in the range $m_r \leq l \leq m-1$, with $p^{(l)} = 1$ and $q^{(l)} = 0$. After k stages, for any $k \geq r-1$, the most significant $m - m_r$ busses carry the bits of p, and therefore any module with arbitration priority $q \neq p$ disables at least its last $m_r$ bits. As a result, for any $s \geq r$ and $i = 0, 1, \ldots, m_r - 1$, $v_i[s] = v_i[r] = 0 = p^{(i)}$, because the busses implement a wired-OR in one stage and no module applies a 1 to busses $b_0$ through $b_{m_r-1}$ anymore (after stage $r-1$).

Thus, after s stages, for $s \geq r$, the m busses carry the corresponding bits of p.

The following shows that taking G(m,t), the optimal codewords of length m bits and interval number at most t, as arbitration priorities, any arbitration process completes in at most t stages. For any subset of arbitration priorities $Q \subseteq G(m,t)$, a corresponding arbitration process with Q as the set of competing arbitration priorities takes at most t stages. Let p be the highest arbitration priority in Q. Since the interval number of p is at most t, the foregoing guarantees that the arbitration process on Q, with p as the highest arbitration priority, takes no more than t stages.

The following discussion provides an illustrative software routine for determining a set of optimal m-bit codewords of interval-number at most t for a desired system, where m is user specified as a predetermined number of arbitration busses or as a function of n the number of modules supported by the system (e.g., $m = \lceil \lg n \rceil + 1$). And t is user specified or determined as a function of n (e.g., $t = \lceil \frac{1}{2} \lg n \rceil$). The software routine is outlined in FIG. 4.

Figure 4:
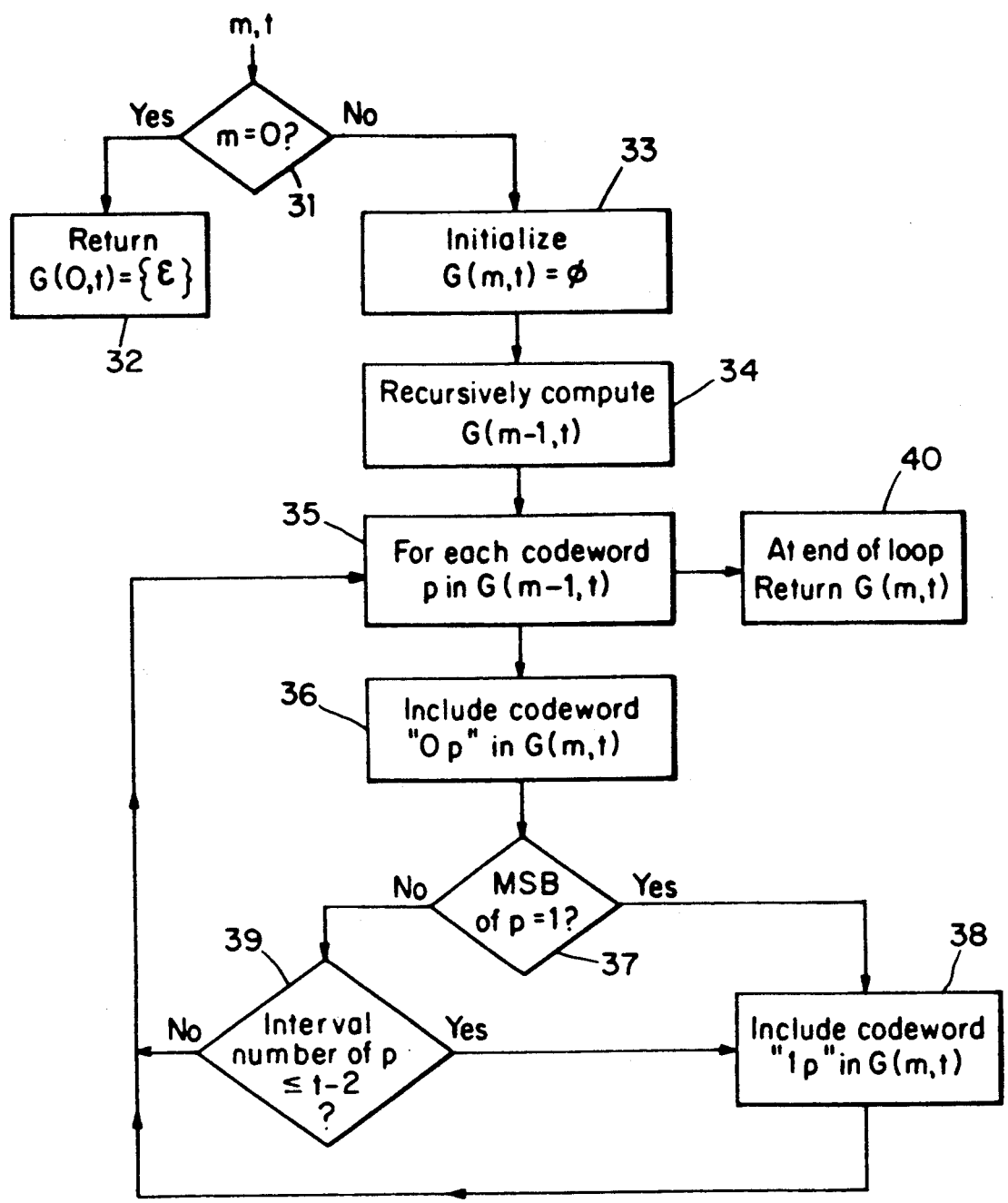
FIG. 4 is a flow diagram of a software routine for determining optimum codewords for arbitration priorities of the present invention.

The recursive routine in FIG. 4, when called with parameters m and t (assume $m \geq 0$, $t \geq 0$), returns the set G(m,t) of all m-bit codewords that have interval-number at most t. The routine begins at 31 by checking whether $m = 0$, in which case 32 it returns $G(0,t) = \{\epsilon\}$, the set of the empty string. Otherwise ($m > 0$) the routine continues at 33, where it initializes G(m,t) to the empty set. Next, the routine calls itself recursively at 34 with parameters $m-1$ and t, and thus computes $G(m-1,t)$, the set of all $(m-1)$-bit codewords that have interval number at most t.

The routine then iterates 35 for each codeword p in $G(m-1,t)$. The m-bit codeword formed by appending a most significant bit 0 to p is added to the set G(m,t) at 36 in FIG. 4. At 37, the routine checks whether p begins with a most significant bit 1, in which case the routine adds 38 the m-bit codeword formed by appending a most significant bit 1 to p to the set G(m,t). If p begins with 0 and has interval number at most t−2 (checked at 39), then the m-bit codeword 1p is also added to G(m,t) at 38 in FIG. 4.

The routine then continues in the loop 35 over p in G(m−1,t). Finally, at the end of the loop 40, the routine returns G(m,t).

It is understood that different arbitration systems of the present invention can be designed with m arbitration busses, arbitration time t, and n modules chosen with the forgoing discussion in mind. Moreover using the principles of the present invention, the bus-time tradeoff in designing an arbitration system is readily controlled by the designer.

Figure 5:
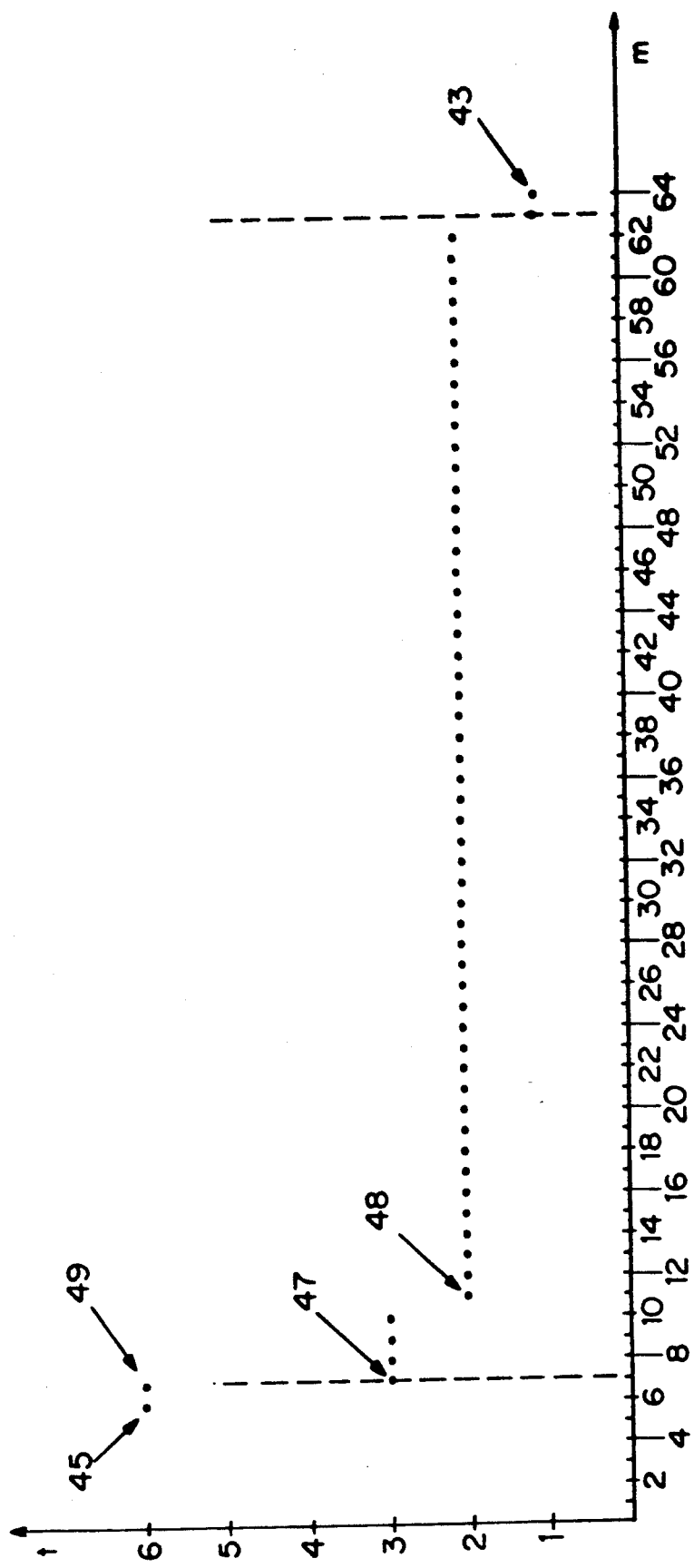
FIG. 5 is a graph of arbitration bus-time trade-off among the prior art arbitration schemes and the present invention arbitration scheme for n=64 modules

FIG. 5 illustrates the bus-time tradeoff for systems consisting of n=64 modules. In a linear arbitration system shown at 43 in FIG. 5, m=64 busses are required and achieve an arbitration time t=1. In a binary arbitration system shown at 45 in FIG. 5, m= $\lceil \lg n \rceil$ =6 arbitration busses are used which results in an arbitration time of t= $\lceil \lg n \rceil$ =6. Hence, neither the linear arbitration nor the binary arbitration systems efficiently utilize the resources.

In comparison, the arbitration system of the present invention allows use of a range of arbitration busses $7 \leq m \leq 63$, to achieve an arbitration time in the range $1 \leq t \leq 3$. This is shown between the broken lines in FIG. 5. The preferred embodiment of the present invention, for n=64 modules, employs m= $\lceil \lg n \rceil$ +1=7 arbitration busses, one more arbitration bus than used in the asynchronous binary arbitration scheme 45. This results in speeding up the arbitration process by a factor of 2 where arbitration time t= $\lceil \frac{1}{2} \lg n \rceil$ =3 as shown at 47 in FIG. 5. On the other hand, allowing another time unit over the linear arbitration scheme at 43 enables reducing the number of arbitration busses from m=n=64 to m=11≈√2n, as shown at 48 in FIG. 5.

Notice, that the technique of D. Del Corso and L. Verrua in "Contention Delay in Distributed Priority Networks", *Microprocessing and Microprogramming*, volume 13, no. 1, January 1984, pages 21–29, applied to the case of n=64 yields a system with m= $\lceil \lg(n+1) \rceil$ = $\lceil \lg 65 \rceil$ =7 busses and t= $\lceil \lg (n+1) \rceil$ −1=6 units of bus-settling delay. This is indicated at point 49 in FIG. 5. Hence the arbitration system of the present invention, and especially of the preferred embodiment, is certainly superior to any of the other known systems where it divides the arbitration time by 2 by adding at most one more arbitration bus.

Notice, however, that in order to achieve another factor of 2 improvement in the arbitration time over the preferred embodiment, adding another constant number of arbitration busses to the $\lceil \lg n \rceil$ busses is not enough. Asymptotically as n grows without bound, one needs to use more than $(1+\epsilon) \lg n$ busses, for $\epsilon > 0.232$, in order for the sum $$\sum_{l=0}^{t} \binom{m}{l}.$$

with t=¼ lg n, to be at least n. This can be verified by Stirling's formula as follows. When m is greater than lg n but smaller than 1.232 lg n, and when t=¼ lg n<m/4, the sum of the first m/4 binomial coefficients $$\binom{m}{l}.$$

for $0 \leq l \leq m/4$, does not exceed n. This demonstrates that the present invention arbitration system of the preferred embodiment, which uses $\lceil \lg n \rceil$ +1 arbitration busses, exhibits a most economic balance, much more than the binary arbitration system of the prior art.

While the invention has been particularly shown and described with reference to a preferred embodiment thereof, it will be understood by those skilled in the art that various changes in form and details may be made therein without departing from the spirit and scope of the invention as defined by the appended claims.

I claim:

1. In a digital system having a plurality of modules coupled to a plurality of arbitration busses, an arbitration system comprising:

means for assigning binary codewords to modules of the digital system, each codeword having a different binary value for indicating a different priority of a module than that indicated by the other codewords, successively higher-valued binary codewords indicating successively higher priorities, different codewords being assigned to different modules such that different modules have different priorities as indicated by respective codewords of the modules, and during arbitration, resolution of each codeword producing data-dependent delays sufficiently small to reduce, by a factor of s, time required to resolve the codewords during arbitration such that arbitration time t, in units of bus-settling delay, one unit being the amount of time required for an arbitration buss to stabilize, satisfies $$t \leq \lceil \log_2 n \rceil / s$$

where s>1, and n is maximum number of modules supportable by the digital system, the codewords being selected from a set of optimal codewords which (i) minimize arbitration time t when number of modules n and number of arbitration busses m are known, (ii) maximize number of modules n when arbitration time t and number of arbitration busses m are known, and (iii) minimize number of arbitration busses m when arbitration time t and number of modules n are known; and an arbitration circuit for providing to the modules an arbitration protocol performed by modules involved in an arbitration, the arbitration protocol enabling each module involved in an arbitration to (a) apply its binary codeword to arbitration busses of the digital system, (b) continuously monitor arbitration busses, and (c) conditionally disable application of a portion of its binary codeword according to binary values of portions of codewords applied to arbitration busses by other modules in a manner such that final logic values on the arbitration busses provide the binary value of the codeword of highest binary value involved in the arbitration, the respective module assigned to that codeword being determined as the highest priority module involved in the arbitration with respect to the other modules involved in the arbitration as indicated by the codewords of the modules.

2. An arbitration system as claimed in claim 1 wherein $s=2$ such that arbitration time $t= \lceil \frac{1}{2} \log_2 n \rceil$ units of bus-settling delay.

3. An arbitration system as claimed in claim 1 wherein number of arbitration busses in the digital system is at most $\lceil \log_2 n \rceil +1$.

4. In a digital system having a plurality of modules coupled to a plurality of arbitration busses, an arbitration system comprising:

means for assigning a plurality of binary codewords to modules of the digital system, each codeword having a binary value for indicating priority of a respective module relative to the other modules, successively higher-valued binary codewords indicating successively higher priorities, the means assigning different codewords to different modules such that different modules have different priorities as indicated by respective binary codewords, each codeword having a length of m-bits and having at most t intervals of consecutive same binary digits when disregarding consecutive leading 0 digits, where m is number of arbitration busses, t is arbitration time, in units of bus-settling delay, one unit being the amount of time required for an arbitration buss to stabilize, and $t<m$, such that the codewords are selected from a set of optimal codewords which (i) minimize t when m and n maximal number of modules supportable in the digital system are known, (ii) maximize n when t and m are known, and (iii) minimize m when t and n are known; and an arbitration circuit for providing the modules an arbitration protocol, modules involved in an arbitration performing the arbitration protocol by (a) applying their respective binary codewords to arbitration busses of the digital system, each bit on a different bus, (b) continuously monitoring arbitration busses, and (c) conditionally disabling application of an end portion of a respective binary codeword when the end portion has a first bit of value zero applied to a bus on which another module is applying a bit of value one, such that final logic values on the arbitration busses provide the binary value of the codeword of highest binary value involved in the arbitration, the respective module assigned to that codeword being determined as the highest priority module involved in the arbitration.

5. An arbitration system as claimed in claim 4 wherein the arbitration busses are wired-OR busses.

6. An arbitration system as claimed in claim 4 wherein $t= \lceil \frac{1}{2} \log_2 n \rceil$ units of bus-settling delay, where n is maximal number of modules supportable by the digital system.

7. An arbitration system as claimed in claim 4 wherein $t= \lceil \frac{1}{2} \log_2 n \rceil$ units of bus-setting delay and $m= \lceil \frac{1}{2} \log_2 n \rceil$, where n is maximal number of modules supportable by the digital system.

8. An arbitration system as claimed in claim 4 wherein $t= \lceil \frac{1}{2} \log_2 n \rceil$ units of bus-settling delay and $m= \lceil \log_2 n \rceil +1$ where n is maximal number of modules supportable in the digital system.

9. In a digital system having a plurality of modules coupled to a plurality of arbitration busses, an arbitration system comprising:

means for assigning a plurality of multi-bit binary codewords to modules of the digital system, each codeword having a binary value, successively higher-valued binary codewords indicating successively higher priorities, the means assigning different codewords to different modules such that different modules have different priorities as indicated by respective codewords; and an arbitration circuit for providing the modules an arbitration protocol, modules involved in an arbitration performing the arbitration protocol by (a) applying their respective binary codewords to arbitration busses of the digital system, each bit on a different bus, (b) continuously monitoring arbitration busses, and (c) conditionally disabling application of an end portion of a respective binary codeword when the end portion has a first bit of value zero applied to a bus on which another module is applying a bit of value one, such that final logic values on the arbitration busses provide the binary value of the codeword of highest binary value involved in the arbitration, the respective module assigned to that codeword being determined as the highest priority module involved in the arbitration, the arbitration protocol enabling the module of highest priority involved in the arbitration to be determined in an arbitration time of at most $\lceil \frac{1}{2} \log_2 n \rceil$ units of bus-settling delay, one unit being the amount of time required for an arbitration buss to stabilize, where n is maximal number of modules supportable by the digital system;

said plurality of multi-bit binary codewords being selected from a set of optimal codewords which (i) minimize arbitration time when maximal number of modules and number of arbitration busses are known (ii) maximizing number of modules when number of arbitration busses and maximal arbitration time are known, and (iii) minimize number of arbitration busses when maximum number of modules and maximal arbitration time are known.

10. An arbitration system as claimed in claim 9 wherein the arbitration busses are wired-OR busses.

11. An arbitration system as claimed in claim 9 wherein there are $\lceil \log_2 n \rceil +1$ arbitration busses.

12. An arbitration system as claimed in claim 9 wherein there are $\lceil \log_2 n \rceil$ arbitration busses.

13. An arbitration system as claimed in claim 9 wherein each codeword has a length of $(\log_2 n +1)$ bits and has at most $\lceil \frac{1}{2} \log_2 n \rceil$ intervals of of consecutive binary digits when disregarding leading consecutive 0 digits.

14. An arbitration system as claimed in claim 9 wherein each codeword has a length of $\log_2 n$ bits and has at most $\lceil \frac{1}{2} \log_2 n \rceil$ intervals of consecutive binary digits when disregarding leading consecutive 0 digits.

15. A method of arbitrating among a plurality of modules in a digital system, the method comprising the steps of:

providing a plurality of multi-bit binary priority codewords for indicating different priorities of different modules, each codeword having a different binary value, codewords of successively higher binary values indicating successively higher priorities, each priority codeword being selected from a set of optimal codewords as a function of arbitration time t, in units of bus-settling delay, one unit of bus-settling delay being the amount of time for an arbitration bus to stabilize, and as a function of a number of arbitration busses m required for arbitration, including having a length of m bits and at most t intervals of consecutive same binary digits when disregarding consecutive leading 0 digits, where $t<m$ such that resolution of codewords during arbitration exhibits controlled data-dependent delays;

assigning different priority codewords to different modules supportable in the desired digital system; and during arbitration among contending modules of the desired digital system, performing on the contending modules an arbitration protocol which enables each contending module to (a) apply its binary priority codeword to the arbitration busses of the desired digital system, (b) continuously monitor arbitration busses, and (c) conditionally disable application of a portion of the codeword of the contending module according to binary values of portions of codewords applied to arbitration busses by other contending modules, in a manner such that final logic values on the arbitration busses provide the binary value of the codeword of highest binary value involved in the arbitration, the contending module assigned to that codeword being determined as the module of highest priority involved in the arbitration.

16. A method as claimed in claim 15 wherein:
the arbitration busses are wired-OR busses; and
the arbitration protocol includes placing different bits of a priority codeword on different arbitration busses.

17. A method as claimed in claim 15 wherein each priority codeword is established such that $$m = \lceil \log_2 n \rceil$$

and $$t = \lceil \tfrac{1}{2} \log_2 n \rceil$$

where t is maximum arbitration time in units of bus-settling delay,
m is number of arbitration busses, and
n is number of modules supportable by the digital system.

18. A method as claimed in claim 15 wherein each priority codeword is established such that $$m = \lceil \log_2 n + 1 \rceil$$

and $$t = \lceil \tfrac{1}{3} \log_2 n \rceil$$

where t is maximum arbitration time in units of bus-settling delay,
m is number of arbitration busses, and
n is number of modules supportable by the digital system.

19. A method of arbitrating on a set of arbitration busses in a digital system comprising the steps of:

given two of three parameters: (a) m, number of arbitration busses in a desired digital system, (b) t, arbitration time in units of bus-settling delay of the desired digital system, a unit of bus-settling delay being the amount of time required for an arbitration buss to stabilize and (c) n, maximal number of modules supportable by the desired digital system, optimizing the remaining parameter such that $$1 \leq t < \lceil \log_2 n \rceil$$

$$\lceil \log_2 n \rceil \leq m < n, \text{ and}$$

$$n \leq \sum_{l=0}^{t} \binom{m}{l};$$

selecting from a set of possible binary priority codewords a plurality of optimum binary priority codewords for indicating different priorities of different modules, each codeword having a different binary value, codewords of successively higher binary values indicating successively higher priorities, said selecting being performed such that (i) m is minimized when t and n are given, (ii) n is maximized when m and t are given, or (iii) t is minimized when m and n are given, each optimum binary priority codeword having a length of m-bits and having at most t intervals of consecutive same binary digits when disregarding consecutive leading zero digits;

assigning different selected optimum priority codewords of successively higher binary values to different modules of successively higher desired priority in the desired digital system; and during arbitration among contending modules of the desired digital system, performing an arbitration protocol on the contending modules such that each contending module applies its binary priority codeword to the arbitration busses, monitors the arbitration busses, and conditionally disables application of a portion of its codeword according to binary values of portions of codewords applied to arbitration busses by other contending modules, such that final logic values on the arbitration busses provide the binary value of the codeword of highest binary value involved in the arbitration, the contending module assigned to that codeword being determined as the module of highest priority involved in the arbitration.

* * * * *

UNITED STATES PATENT AND TRADEMARK OFFICE
CERTIFICATE OF CORRECTION

PATENT NO. : 5,101,482
DATED : March 31, 1992
INVENTOR(S) : Shlomo Kipnis

It is certified that error appears in the above-identified patent and that said Letters Patent is hereby corrected as shown below:

In column 16, line 43, (Claim 13, line 2 of that claim), delete "$(\log_2 n + 1)$" and insert ---$(\lceil \log_2 n \rceil + 1)$---.

In column 16, line 48, (Claim 14, line 2 of that claim), delete "$\log_2 n$" and insert ---$\lceil \log_2 n \rceil$---.

In column 17, line 46, (Claim 18, line 3 of that claim), delete "$m = \lceil \log_2 n + 1 \rceil$" and insert ---$m = \lceil \log_2 n \rceil + 1$---.

Signed and Sealed this

Twenty-first Day of September, 1993

Attest:

BRUCE LEHMAN

*Attesting Officer*          *Commissioner of Patents and Trademarks*